(12) United States Patent
Otterby (10) Patent No.: US 6,926,034 B1
(45) Date of Patent: Aug. 9, 2005

(54) HYDRAULIC SPOOL LOCK AND METHOD OF USE

(75) Inventor: Michael A. Otterby, South Sioux City, NE (US)

(73) Assignee: Prince Manufacturing Corporation, North Sioux City, SD (US)

( * ) Notice: Subject to any disclaimer, the term of this patent is extended or adjusted under 35 U.S.C. 154(b) by 208 days.

(21) Appl. No.: 10/350,623

(22) Filed: Jan. 24, 2003

(51) Int. Cl.$^7$ .......................... F16K 11/14; G05G 5/06; G05G 9/047
(52) U.S. Cl. ..................... 137/636; 74/18.1; 74/471 R; 74/471 XY; 74/523; 74/527; 74/491; 251/95; 251/98; 251/113; 137/1; 137/15.21
(58) Field of Search .................. 74/471 R, 471 XY, 74/18, 18.1, 473.1, 473.13, 473.3, 473.33, 74/473.34, 491, 523, 527; 137/636, 636.1, 137/636.2, 1, 15.21; 251/74, 95, 98, 113

(56) References Cited

U.S. PATENT DOCUMENTS

| | | | |
|---|---|---|---|
| 2,075,917 A * | 4/1937 | Vorech ..................... | 137/636.1 |
| 2,403,519 A * | 7/1946 | Gardiner ................... | 137/636 |
| 2,705,971 A * | 4/1955 | Dorkins .................... | 137/636 |
| 2,958,233 A * | 11/1960 | Johnson ................... | 137/636.2 |
| 3,131,574 A * | 5/1964 | Clingerman ............... | 137/636 |
| 3,170,579 A | 2/1965 | Popelier | |
| 4,274,445 A * | 6/1981 | Cooper ..................... | 137/636.1 |
| 4,470,367 A | 9/1984 | Bergeron | |
| 4,821,600 A * | 4/1989 | Griffiths .................... | 74/527 |
| 4,887,944 A | 12/1989 | Worby et al. | |
| 4,995,421 A | 2/1991 | Bonacorsi et al. | |
| 5,235,869 A * | 8/1993 | Nyezdatny ............... | 74/471 XY |
| 5,417,143 A | 5/1995 | Pasek | |
| 5,694,970 A * | 12/1997 | Staranchuk ............... | 251/113 |
| 6,122,987 A * | 9/2000 | Barbieri et al. ........... | 74/471 XY |
| 6,328,127 B1 * | 12/2001 | Hori et al. ................ | 74/471 XY |

* cited by examiner

Primary Examiner—George L. Walton
(74) Attorney, Agent, or Firm—McKee, Voorhees & Sease, P.L.C.

(57) ABSTRACT

A hydraulic spool lock with a hydraulic spool housing, first and second hydraulic spools mounted within the hydraulic spool housing for independent selective movement with respect to the hydraulic spool housing, and a lock plunger movable mounted to the hydraulic spool housing. The present invention allows independent movement of the spools with respect to the hydraulic spool housing when the hydraulic spool lock is in the unlocked position. The present inventions prevents movement of the spools with respect to the hydraulic spool housing when the hydraulic spool lock is in a locked position.

18 Claims, 8 Drawing Sheets

HYDRAULIC SPOOL LOCK AND METHOD OF USE

BACKGROUND OF THE INVENTION

The present invention relates generally to a spool-locking device and specifically to a hydraulic spool lock for a two-spool directional control valve. The two-spool directional control valve is typically used to control a bucket and boom of a front-end loader. These valves typically have a single joystick handle used to control the two spools. These valves if accidentally moved can cause an unintended movement of a bucket and boom of a front-end loader and cause uncontrolled and unsafe movement of the bucket and boom of a front-end loader.

The invention specifically improves upon the spool locking devices typically used for a two-spool directional control valve. Although other devices in use may prevent the movement of the spools in a directional control valve, there have been several problems not addressed in current hydraulic spool locking devices. Specifically, it is a objective of our hydraulic spool lock to provide a device that is integral to the handle mounting housing or spool housing.

A further objective of the present invention is to create a device that is integral to a hydraulic spool housing or boot housing.

A further objective of the present invention is to provide a device which locks both spools and prevents movement of either spool.

A further objective of the present device is to provide for a locking between the plunger and the spools with direct contact between the plunger and the spools when the plunger is in the locked position.

A still further objective of the present device is to provide a locking device that is close-coupled to the two-spool directional control valve.

The means and method of accomplishing these and other objectives will become apparent from the following description of the invention.

BRIEF SUMMARY OF THE INVENTION

The present invention is a hydraulic spool lock with a hydraulic spool housing, at least first and second hydraulic spools mounted within the hydraulic spool housing for independent selective movement with respect to the hydraulic spool housing, and a lock plunger movable mounted to the hydraulic spool housing for movement from an unlocked position permitting movement of the at least first and second hydraulic spools with respect to the hydraulic spool housing to a locked position preventing movement of the at least first and second spools with respect to the hydraulic housing.

The present invention hydraulic spool lock is also summarized as a plunger, a handle mounting housing, the plunger being slidingly mounted to the handle mounting housing for movement from an unlocked position to a locked position, a first and second lock member attached to the plunger, an end attached to the first and second lock member adapted for engaging a first spool and a second spool while in the locked position, and a boot housing supporting the handle mounting housing, and orifices in the boot housing adapted for sliding movement of the lock plunger, the first lock member, and the second lock member.

The present invention may also be summarized as a method for locking at least one spool mounted for movement within a hydraulic spool housing. The method comprising moving a plunger movably mounted to the hydraulic spool housing from an unlocked position free from engagement with the one spool to a locked position retentively engaging the one spool to prevent movement of the one spool relative to the hydraulic spool housing.

DETAILED DESCRIPTION OF THE PREFERRED EMBODIMENT

Figure 2:
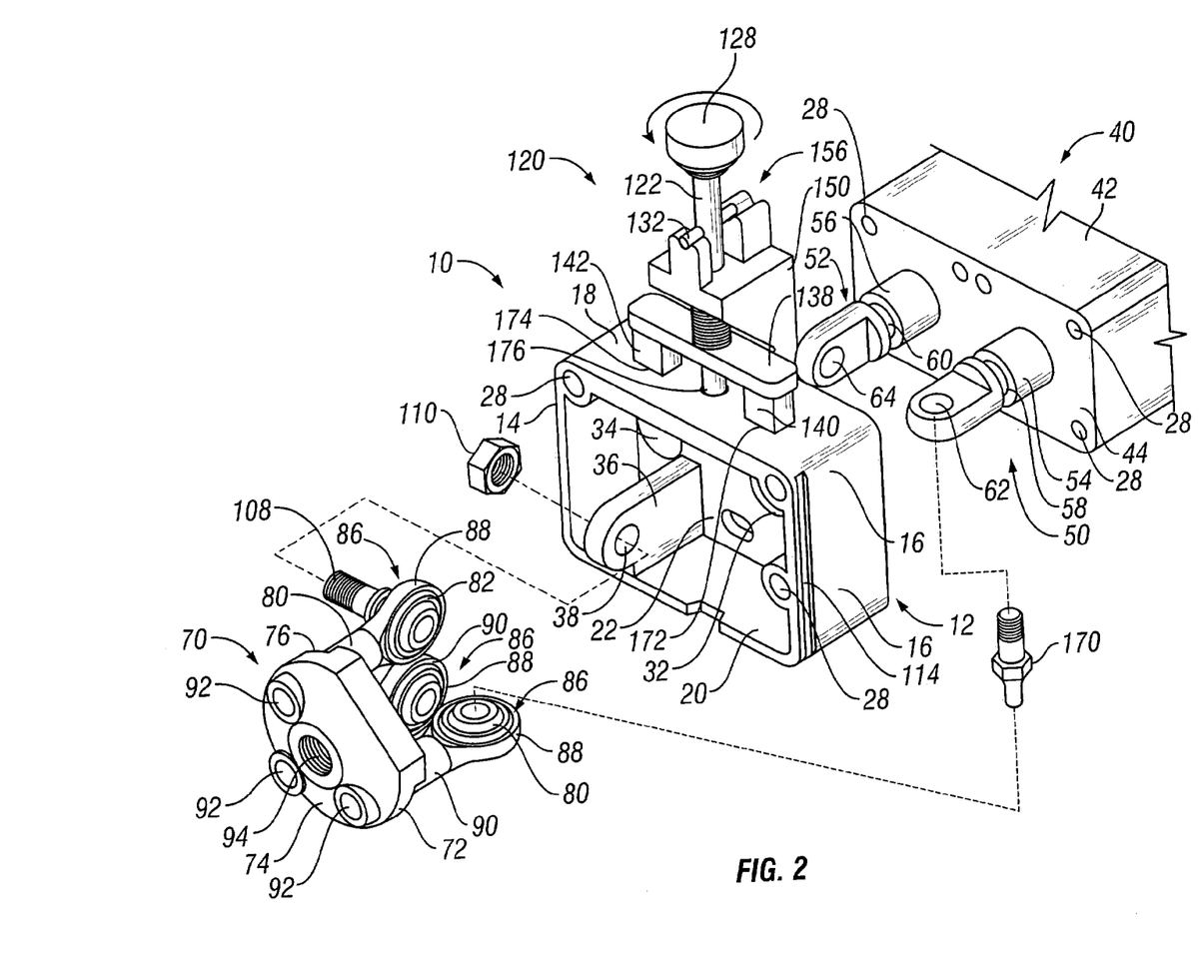
FIG. 2. is an exploded perspective view of the hydraulic spool lock.

Referring to the drawings, numeral 10 generally refers to the hydraulic spool lock. The hydraulic spool lock 10, as seen in FIG. 2, has a hydraulic spool lock housing 12.

The hydraulic spool housing, joystick housing, or boot housing 12 is generally in the shape of a rectangular box. The hydraulic spool housing 12 has a first housing side 14, a second housing side 16, a third housing side 18, and a fourth housing side 20. All four housing sides 14, 16, 18, 20 are joined in unitary assembly to form the rectangular box. Alternatively, the hydraulic spool housing 12 may be shaped in other fashions well known in the art.

The sides 14, 16, 18, 20 of the hydraulic spool housing 12 along with the joystick assembly 70 provide mounting surfaces for flexible protective boots commonly used in the art.

The hydraulic spool housing 12 has a back plate 22 that is attached to the hydraulic spool housing 12. The back plate 22 has a first hydraulic spool orifice 32 and a second hydraulic spool orifice 34. The third housing side 18 has first and second lock member orifices, respectively 172, 174. A plunger orifice 176 is between the first and second lock member orifices 172, 174.

The hydraulic spool housing 12 is held in place by screws 26 being put into screw holes 28. The screw holes 28 extend through the hydraulic spool housing 12 and the spool assembly 40. Alternatively, the hydraulic spool housing 12 may be attached to the spool assembly 40 by other means well known in the art. Alternatively, the hydraulic spool housing 12 may be integrated with the spool assembly 40.

As seen in FIG. 2 a fixed mount 36 is attached to the fourth housing side 20 and the back plate 22. Alternatively, the fixed mount 36 may be attached to the fourth housing side 20. Alternatively, the fixed mount 36 may be attached at other points known in the art. The fixed mount 36 has a fixed pivot mount 38 for attachment of universal ball joint 84.

A spool assembly 40 is positioned adjacent to the hydraulic spool housing 12 at a position adjacent to the back plate 22. The spool assembly 40 has a spool housing or spool assembly member 42 shaped as a rectangular box having a rectangular front face 44. Alternatively, the spool assembly 40 may have a spool housing 42 shaped as other shapes well known in the art.

The spool assembly 40 is integrally attached to the hydraulic valve body 180. Alternatively, the spool assembly 40 may be attached to the hydraulic valve body 180 by other means known in the art.

The rectangular front face 44 of the spool assembly 40 is configured to adjoin to the the back plate 22 of the hydraulic spool housing 12.

Positioned upon the front face 44 of the spool housing 42 is a first spool 50 and a second spool 52. The first spool 50 is moveably mounted in the spool assembly 40. The second spool 52 is moveably mounted in the spool assembly 40.

The first spool 50 has a first locking groove 58, and a first pivot mount or first spool end 62. The second spool 52 has a second spool mount 56 a second spool locking groove 60 and a second spool pivot mount or second spool end 64. The spool mounts 54, 56 and pivot mounts or spool ends 62, 64 are separate pieces and joined together by screwing the pivot mounts into the spool bodies 54 and 56. Alternatively, the pivot mounts may joined to the spool bodies by other means well known in the art. Alternatively, the pivot mounts may be integrally formed with the spool bodies 54 and 56 as one piece.

The first and second hydraulic spools 50, 52 are rotatable within the spool housing 42.

A joystick assembly 70 is positioned on the hydraulic spool housing 12.

Positioned adjacent the ball joint face 76 of the joystick assembly 70 is a first universal ball joint 80, a second universal ball joint 82, and a third universal ball joint 84. Alternatively, the joystick assembly 70 may consist of other forms of universal joints well know in the art.

These universal ball joints 80, 82, 84 are attached to the joystick assembly 70 by a ball joint mount 86. The ball joint mount 86 has a mount angular ring 88 that interfaces with the ball joints 80, 82, 84. The ball joint mount 86 also has a mount stem 90 that is attached to the mount angular ring 88 and is attached to the ball joint face 76 by screw 92. Alternatively, the mount stem 90 is attached to the ball joint face 76 using other means known in the art.

A joystick attachment orifice 94 is approximately centered on the joystick face 74 of the joystick assembly 70. The joystick attachment orifice 94 is threaded for attachment to joystick rod 96. The joystick rod 96 has a first end 98 and a second end 100. The second joystick end 100 is adapted for attachment to joystick control interface 102.

Figure 3:
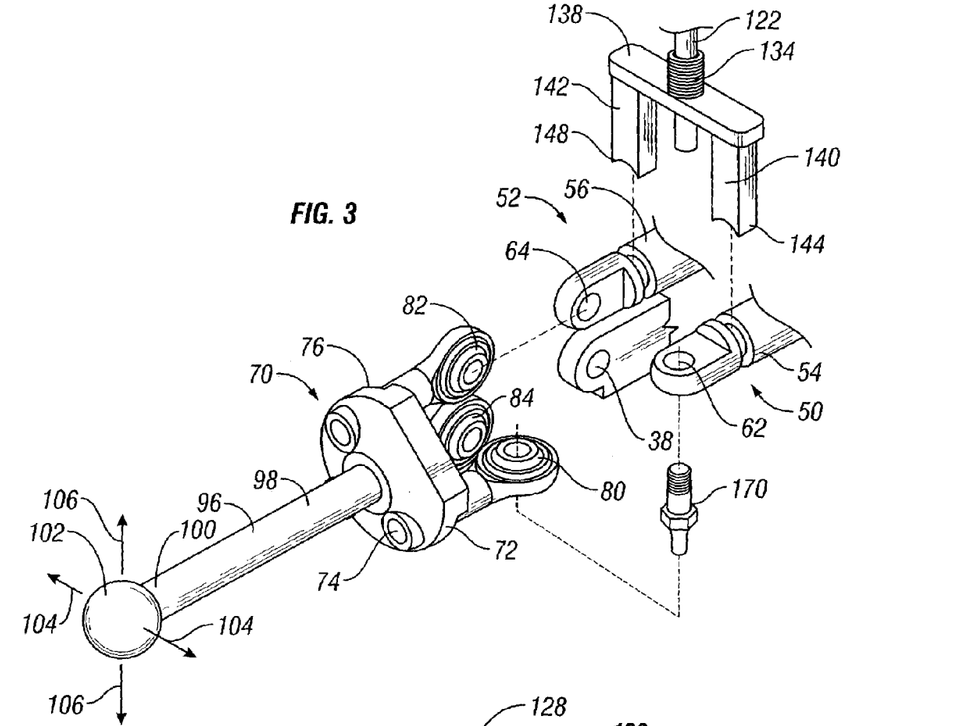
FIG. 3 is an exploded view of the joystick attachment, the pivot mounts, and the lock plunger for illustrating points of connection.

Joystick control interface 102 is spherical in shape for convenient manipulation in both the first axis 104 and second axis 106 as indicated in FIG. 3. The joystick also allows manipulation in the quadrants between axis 104 and 106.

As seen in FIG. 2, the universal ball joints 82, 84 are attached to pivot mounts 64, and 38, respectively, each by bolt 108 and nut 110. Universal ball joint 80 is connected to pivot mount 62 by a sliding stud 170. As seen in FIG. 2, a dashed line indicates how bolt 108 and sliding stud 170 are placed through the universal ball joints 80, 82, 84, the bolts 108 and sliding stud 170 are placed through a pivot mounts 62, 64, 38, and nuts 110 placed upon the bolts 108 and sliding stud 170. Alternatively, other fastening means known in the art may be used to attach the universal ball joints 80, 82, 84 to the pivot mounts 62, 64, 38. Alternatively, as known in the art, different orientations of the pivot mount 38 and ball joints 80, 82, 84 may be used to vary the spool 50, 52 travel associated with movement of control interface 102 along an axis 104, 106.

FIG. 3 illustrates the attachment of the universal ball joints 80, 82, 84 to the pivot mounts 62, 64, 38. First pivot mount 62 is attached to first universal ball joint 80. Second pivot mount 64 is attached to second universal ball joint 82. Second hydraulic fixed pivot mount 38 is attached to third universal ball joint 84. In assembly, the first spool 50 and the second spool 52 are fitted through first hydraulic spool orifice 32 and second hydraulic spool orifice 34, respectively. The pivot mounts 62, 64, 38 are then joined to the universal ball joints 80, 82, 84, respectively.

Figure 4:
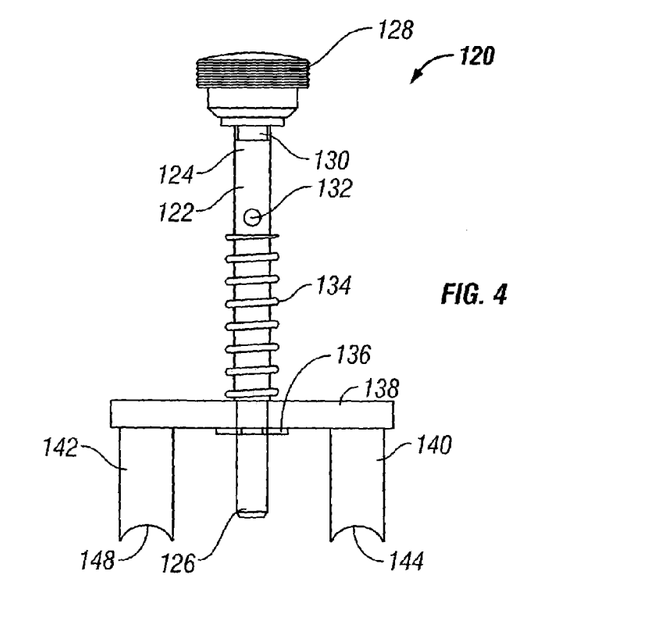
FIG. 4 is a front view of the lock plunger.

Referring to FIG. 4, a lock plunger 120 includes a plunger 122 having a first end 124 and a second end 126. A knob 128 is located adjacent the plunger first end 124 and is attached to the plunger first end 124. The lock plunger 120 includes a roll pin 132 that extends through the plunger 122 to rest upon the hold member 156; specifically, the roll pin 132 rests upon the front holdmember 158 and the back holdmember 160 in the roll pin cavity 164. Alternatively, the roll pin 132 rests upon the front holdmember 158. Alternatively, the roll pin 132 rests upon the back holdmember 160.

The stop member 150 and the holdmember 156 may be referred to generally as the handle mounting housing 166.

The lock plunger 120 has a bias member 134 extending the length of the plunger 122 from a point just below the roll pin 132 and just above a yoke 138. In this embodiment, the bias member is a spring. Alternatively, the bias member 134 may be a compressible cylinder. Alternatively, the bias member 134 may be other devices that store potential energy well known in the art.

A fastener 136 holds the yoke 138 in assembly with plunger 122. The lock plunger 120 has on the yoke 138 a first lock member 140 and a second lock member 142. The first lock member 140 has a first arcuate bottom end 144 and a second arcuate bottom end 148. The ends 144, 148 are designed to engage first locking groove 58 and second locking groove 60, respectively.

Figure 9:
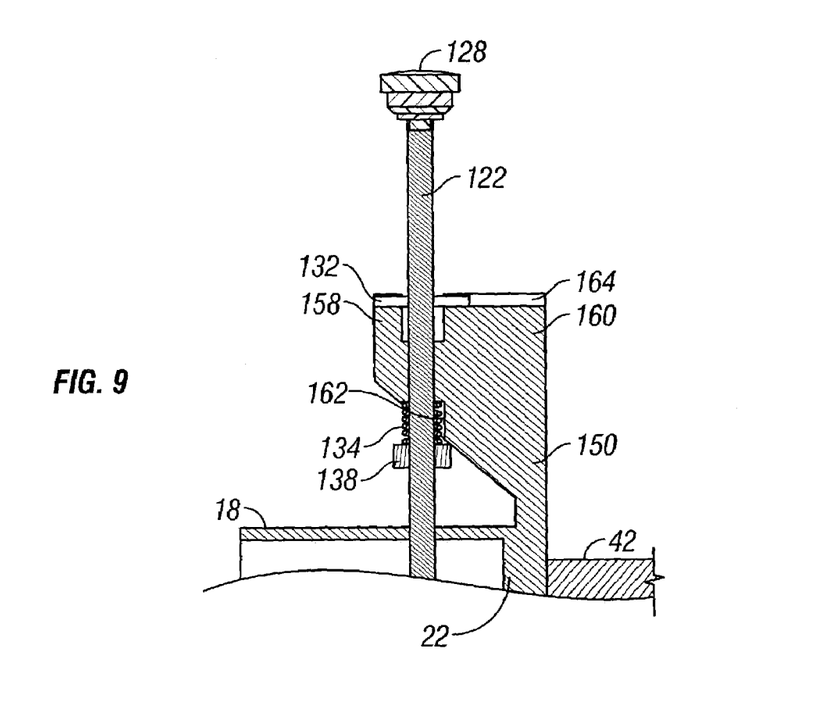
FIG. 9 is sectional view taken along line 8—8 in FIG. 5 and shows the lock plunger in the unlocked position.
Figure 10:
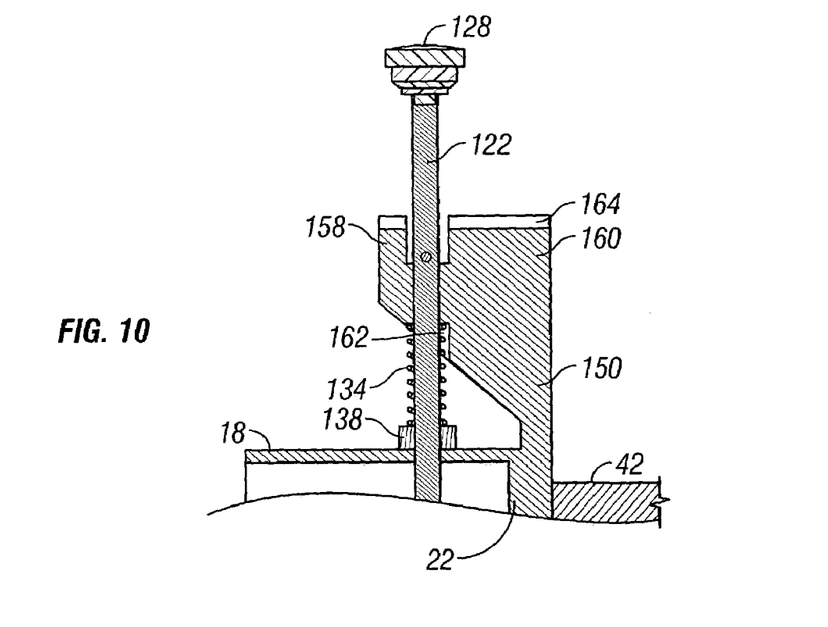
FIG. 10 is a sectional view taken along line 9—9 in FIG. 6 and shows the lock plunger in a locked position.

Stop member 150 has a first end 152 and a second end 154. The stop member first end 152 has affixed to it holdmember 156. The stop member second end 154 is attached to the hydraulic spool housing 12. As seen in FIG. 9 and FIG. 10 a spring cavity 162 exists within the stop member 150.

The lock plunger 120 is assembled by inserting the plunger 122 through the stop member 150. A spring 134 is then placed upon the plunger 122 and compressed against the stop member 150 such that the spring 134 lies in the spring cavity 162. The yoke 138 with first lock member 140 and second lock member 142 attached is then slid into lock plunger orifices 172, 174 and upon the plunger 122 compressing the spring 134. A fastener 136 is then placed upon the plunger 122, as seen in FIG. 4.

While the hydraulic spool housing 12 and the handle mounting housing 166 have been referred to individually, they are formed in unitary assembly in close proximity. Alternatively, the hydraulic spool housing 12 and the handle mounting housing 166 may be separate pieces.

Figure 1:
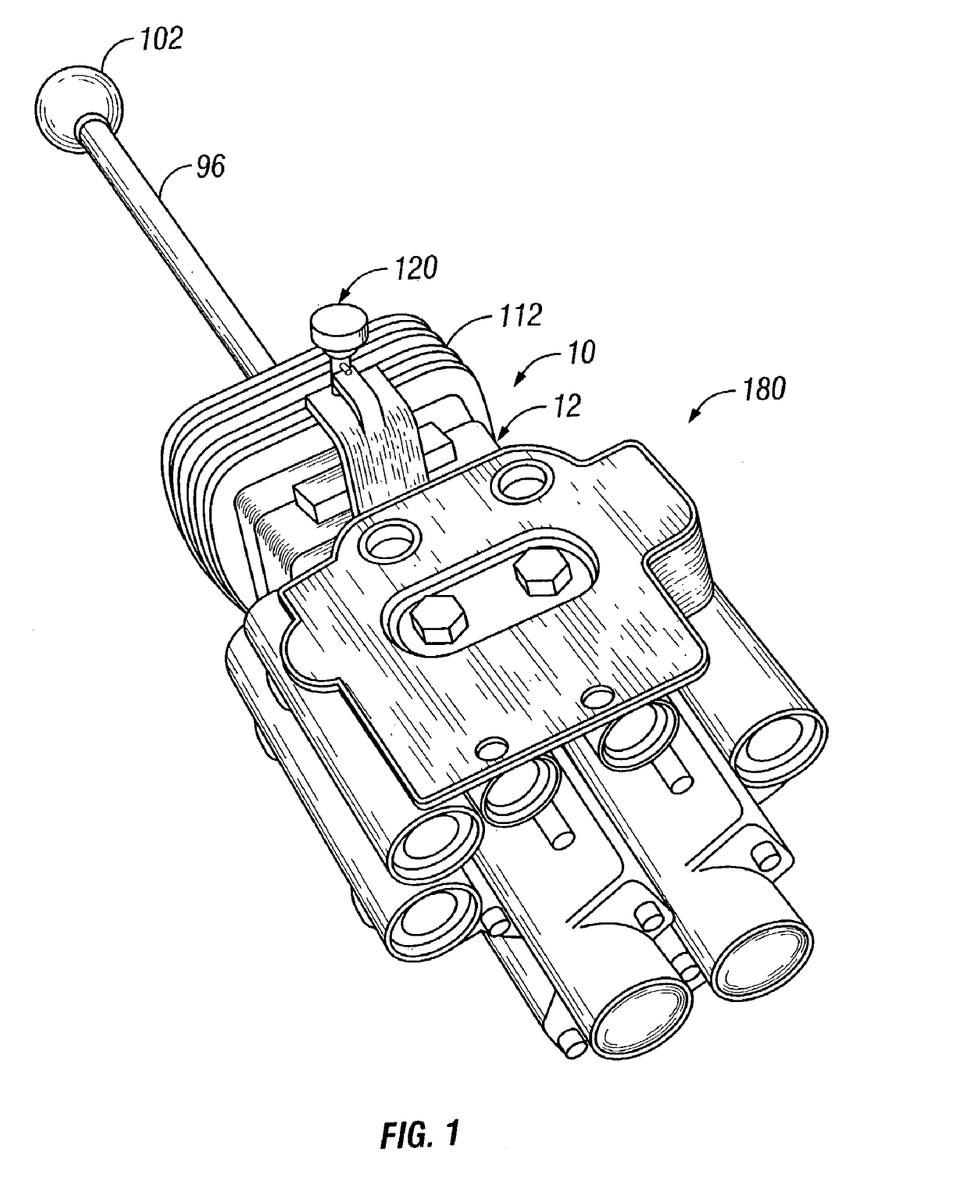
FIG. 1 is a rear perspective view of the hydraulic spool lock attached to and in close proximity with the hydraulic valve body.

The hydraulic spool housing 12 possesses multiple features. The hydraulic spool housing 12 houses the first spool 50, second spool 52, joystick assembly 70, and lock plunger 120. The hydraulic spool housing may also serve as a boot mount. As seen in FIG. 1, the combination of features within one hydraulic spool housing allows for close proximity of the hydraulic spool housing 12 to the hydraulic valve body 180.

Figure 5:
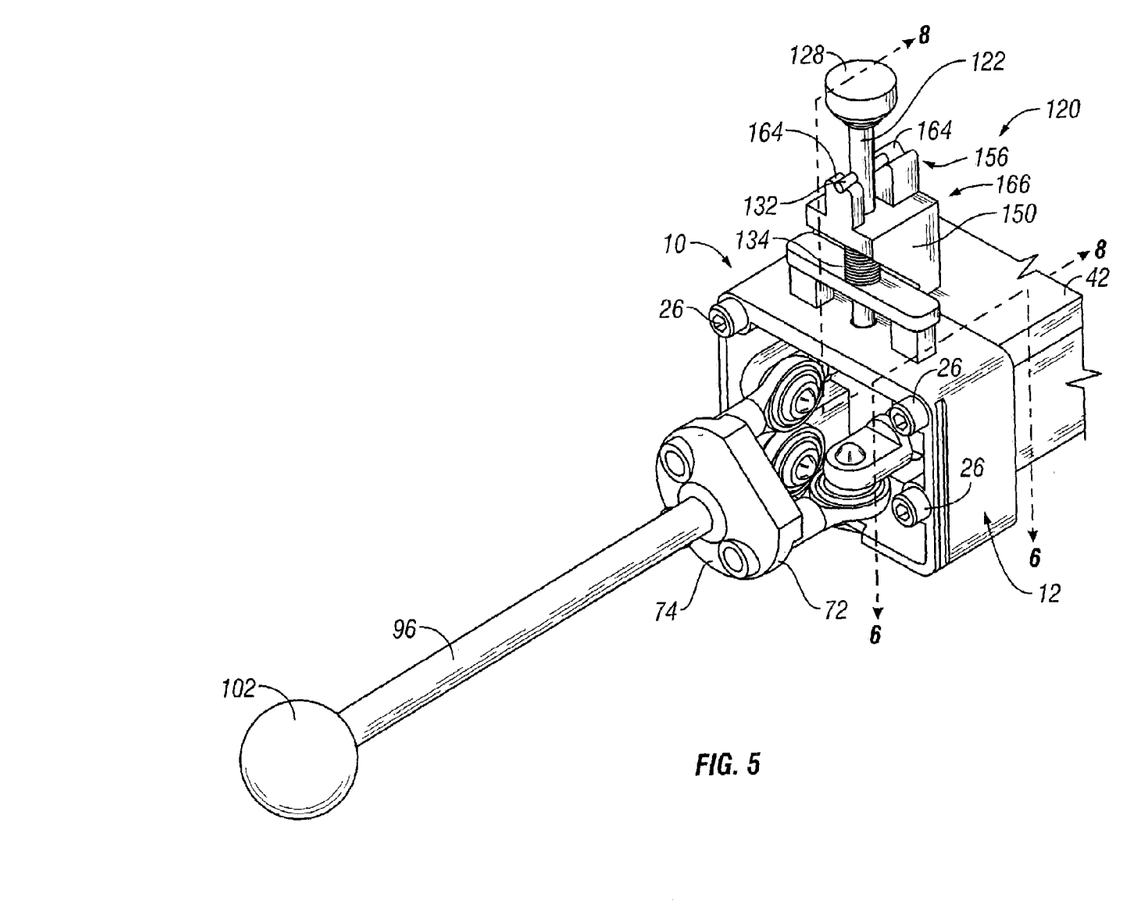
FIG. 5 is a perspective view of the hydraulic spool lock with the lock plunger in an unlocked position.
Figure 7:
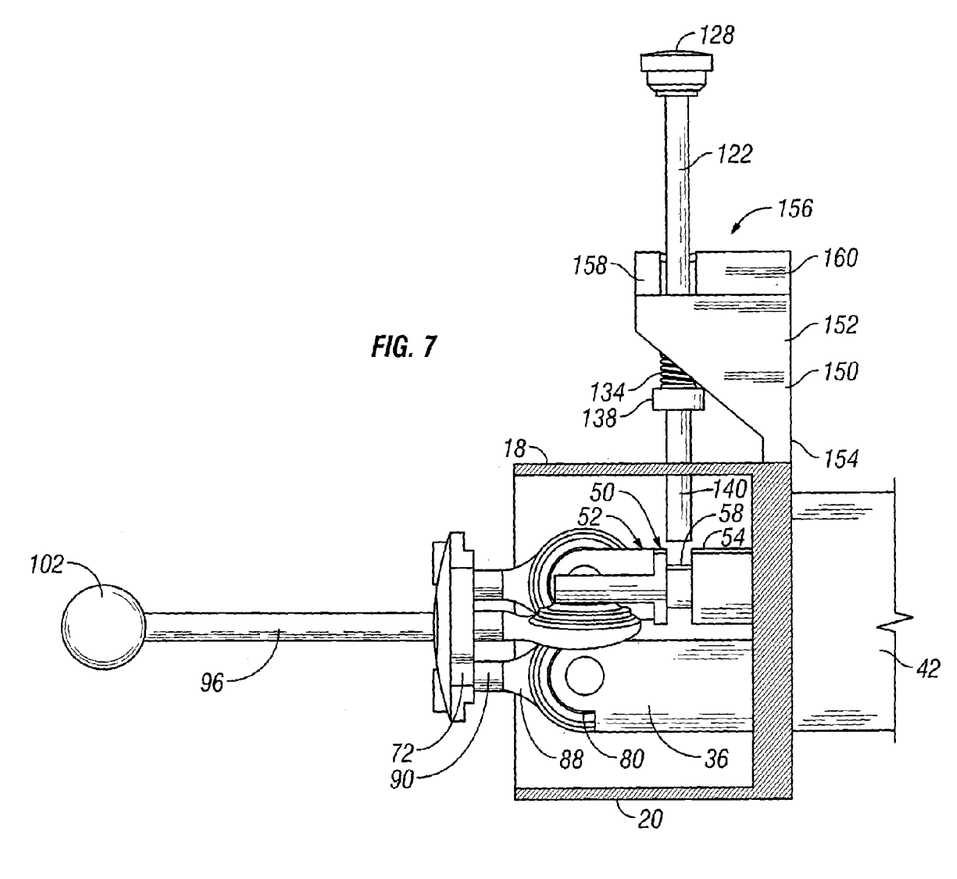
FIG. 7 is a sectional view taken along line 6—6 in FIG. 5 and shows the lock plunger in an unlocked position.

In operation, as seen in FIG. 5, FIG. 7, and FIG. 9, the plunger 122 is in an unlocked position when the spring 134 is compressed due to the roll pin 132 resting in the roll pin cavity 164. The roll pin 132 can be moved to its locked position, resting upon the stop member 150, by pulling the knob 128 and rotating the plunger 122 approximately 90 degrees such that the roll pin may travel through an index in the hold member 156. This disengages the lock plunger 120 from the unlocked position permits the lock plunger 120 under force provided by the bias member 134 to move downwardly and cause the arcuate portions 144, 148 to engage the first locking groove and second locking groove 58, 60.

The downward movement of the plunger 122 is stopped at the locked position when the roll pin 132 contacts the stop member 150. Alternatively, downward movement of the plunger 122 is stopped at the locked position when the yoke 138 contacts the third housing side 18. Alternatively, downward movement of the plunger 122 is stopped at the locked position when the fastener 136 contacts the third housing side 18. Alternatively, the downward movement of the plunger 122 is stopped at the locked position when the first and second lock member arcuate bottom ends 144, 148 contacts the first and second spools, respectively 50, 52.

Figure 6:
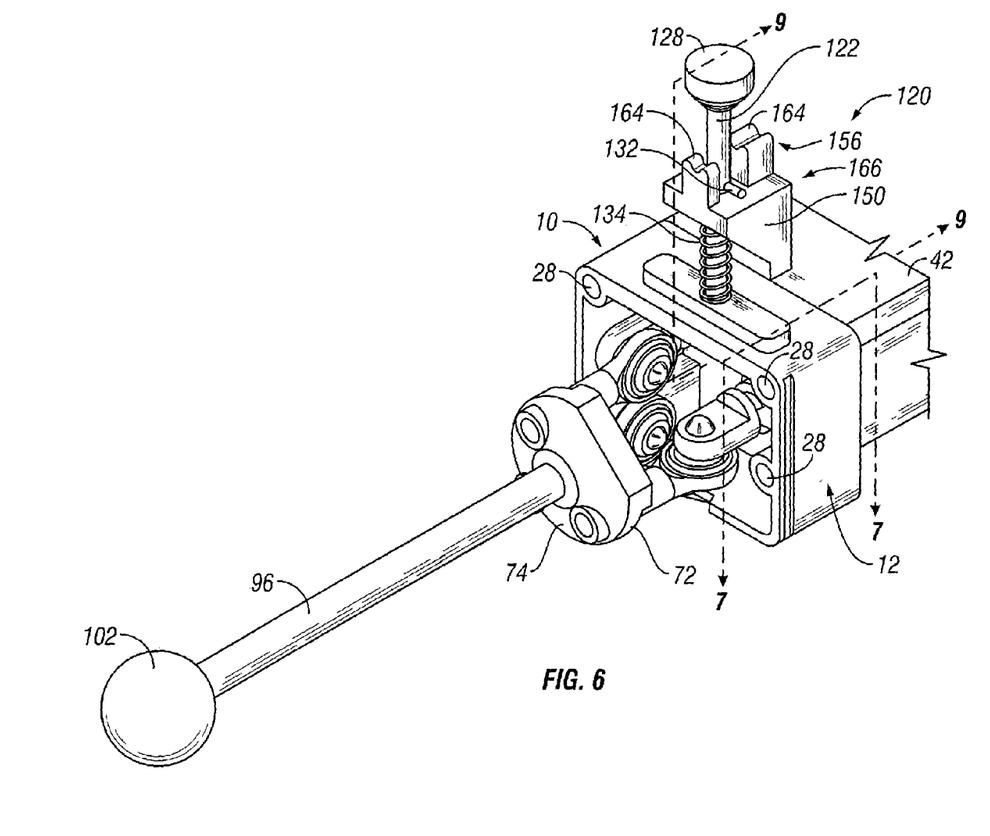
FIG. 6 is a perspective view of the hydraulic spool lock with the lock plunger in a locked position.
Figure 8:
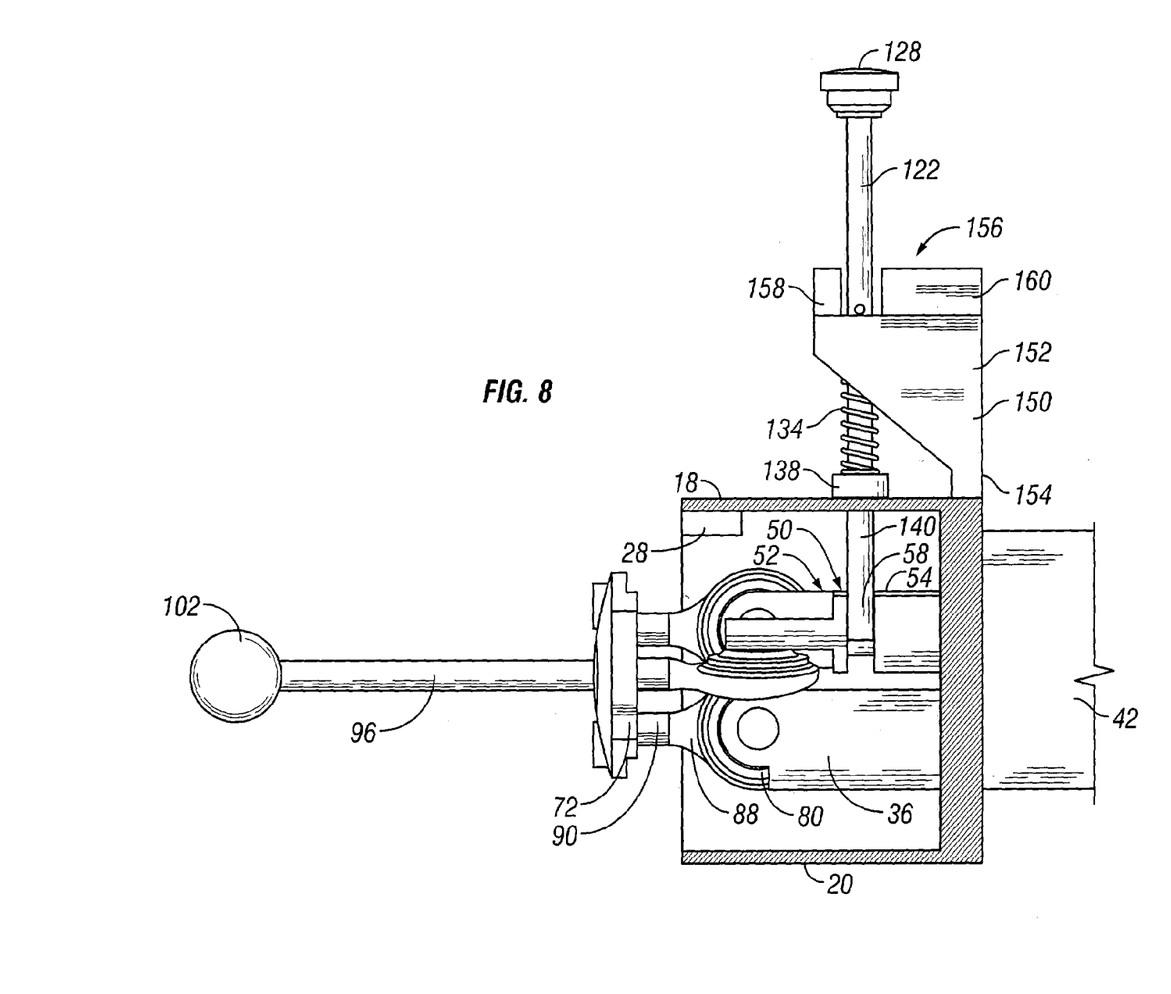
FIG. 8 is a sectional view taken along line 7—7 in FIG. 6 and shows the lock plunger in a locked position.

As seen in FIG. 6, FIG. 8, and FIG. 10, the spools 50, 52 are locked against movement. If the spools 50, 52 are not in their neutral position, the plunger 122 will ride on the large diameter of the first and second spools 50, 52 until the spool bodies 54, 56 move to their neutral positions at which time the lock plunger 120 will move downwardly and lock the spools 50, 52 against movement.

In reverse operation, the knob 128 can be pulled upwardly from the locked position, twisted approximately 90 degrees so that the roll pin 132 is in parallel alignment with the roll pin cavity 164 and released such that the spring 134 holds the roll pin 132 in the roll pin cavity 164. This manipulation moves the hydraulic spool lock 10 from the locked to the unlocked position.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A hydraulic spool lock comprising:
   a hydraulic spool housing;
   at least first and second hydraulic spools mounted within the hydraulic spool housing for independent selective movement with respect to the hydraulic spool housing;
   the at least first and second hydraulic spools having a locking annular groove disposed on a portion thereof;
   a lock plunger with first and second locking members, the lock plunger movable mounted to the hydraulic spool housing for movement from an unlocked position permitting movement of the at least first and second hydraulic spools with respect to the hydraulic spool housing, the lock plunger being moveable to a locked position, wherein the locking members matingly engage within the locking annular groove of each of the first and second hydraulic spools and thereby prevent movement of the at least first and second spools with respect to the hydraulic housing.

2. A hydraulic spool lock according to claim 1 wherein the lock plunger further comprises a bias member biasing the plunger to the locked position.

3. A hydraulic spool lock according to claim 1 wherein the hydraulic spool lock further comprises a hold member centrally located between the first and second hydraulic spools holding the plunger in the unlocked position.

4. A hydraulic spool lock according to claim 3 further comprising the plunger manually movable out of engagement with the hold member so that the plunger can move to its locked position.

5. A hydraulic spool lock according to claim 1 wherein the hydraulic spool lock further comprises a stop member stopping the plunger in the locked position.

6. A hydraulic spool lock according to claim 1 wherein the lock plunger further comprises separate lock members for engaging each of the separate spools respectively.

7. A hydraulic spool lock according to claim 1 wherein at least first and second hydraulic spools further comprises annular groove for engaging the lock plunger when the lock plunger is in its locked position.

8. A hydraulic spool lock according to claim 1 the hydraulic spool lock wherein the bias member is a spring.

9. The hydraulic spool lock according to claim 1 further comprising a hydraulic valve body in close proximity to the hydraulic spool lock.

10. A hydraulic spool lock comprising:
    a plunger;
    a handle mounting housing;
    the plunger being slidingly mounted to the handle mounting housing for movement from an unlocked position to a locked position;
    a first and second lock member attached to the plunger;
    an arcuate end attached to the first and second lock member adapted for engaging an annular groove in each of a first spool and a second spool while in the locked position;
    a boot housing supporting the handle mounting housing;
    a plurality of orifices in the boot housing adapted for sliding movement of the lock plunger, the first lock member, and the second lock member as a unit therein.

11. A hydraulic spool lock according to claim 10 wherein the boot housing further comprises a fixed mount adapted for attachment of a joystick controller.

12. A hydraulic spool lock according to claim 11 wherein the hydraulic spool lock further comprises a first and second spool adapted for attachment to a joystick controller.

13. A hydraulic spool lock according to claim 12 wherein the hydraulic spool lock further comprises a joystick controller attached to the first spool, the second spool, and the fixed mount.

14. A hydraulic spool lock according to claim 13 wherein the joystick controller comprises:
    an adapter plate having a joystick end and a ball joint end;
    a joystick attached at the joystick end;
    a first universal ball joint, a second universal ball joint, and a third universal ball joint attached at the ball joint end;
    the first universal ball joint pivotally attached to the first spool;
    the second universal ball joint pivotally attached to the second spool;

the third universal ball joint pivotally attached to the fixed mount.

15. A method for locking a first spool and a second spool mounted for movement within a hydraulic spool housing, the method comprising:
   providing a hydraulic spool lock having:
   a plunger;
   a handle mounting housing;
   the plunger being slidingly mounted to the handle mounting housing for movement from an unlocked position to a locked position;
   a first and second lock member attached to the plunger;
   a locking end attached to the first and second lock member adapted for engaging a portion of each of the first spool and the second spool while in the locked position;
   a boot housing supporting the handle mounting housing;
   a plurality of orifices in the boot housing adapted for sliding movement of the lock plunger the first lock member, and the second lock member as a unit therein;
   lifting the unit;
   rotating the plunger approximately 90 degrees and releasing the plunger movably mounted to the hydraulic spool housing from the unlocked position free from engagement with the first spool and the second spool to the locked position retentively engaging the first spool and the second spool to prevent movement of the first spool and the second spool relative to the hydraulic spool housing.

16. The method of claim 15, further comprising the step of manually moving the plunger out of engagement with the first spool and the second spool in the locked position.

17. The method of claim 16, further comprising the step of rotating approximately 90 degrees the plunger movably mounted to the hydraulic spool housing from the locked position to the unlocked position.

18. The method of claim 17, further comprising the step of releasing the plunger movably mounted to the hydraulic spool housing into engagement with a hold member holding the plunger in the unlocked position.

* * * * *